Jan. 10, 1950     J. E. FLEMING     2,493,739
SHOCK ABSORBER
Filed Jan. 31, 1946
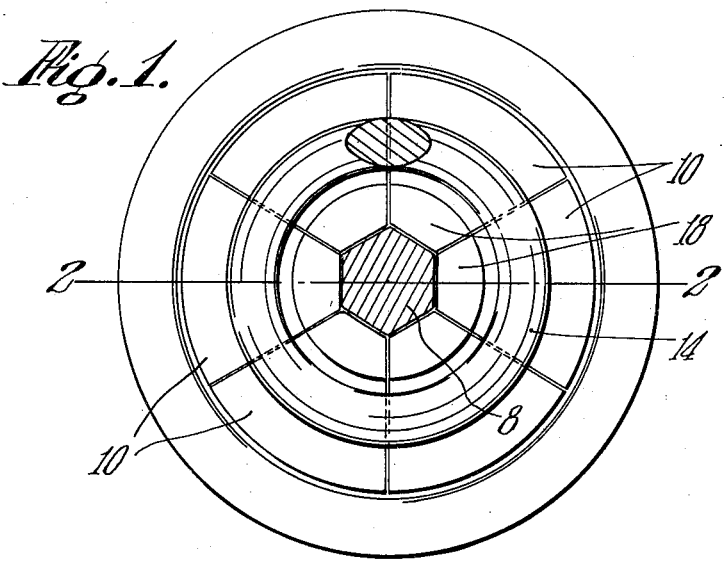
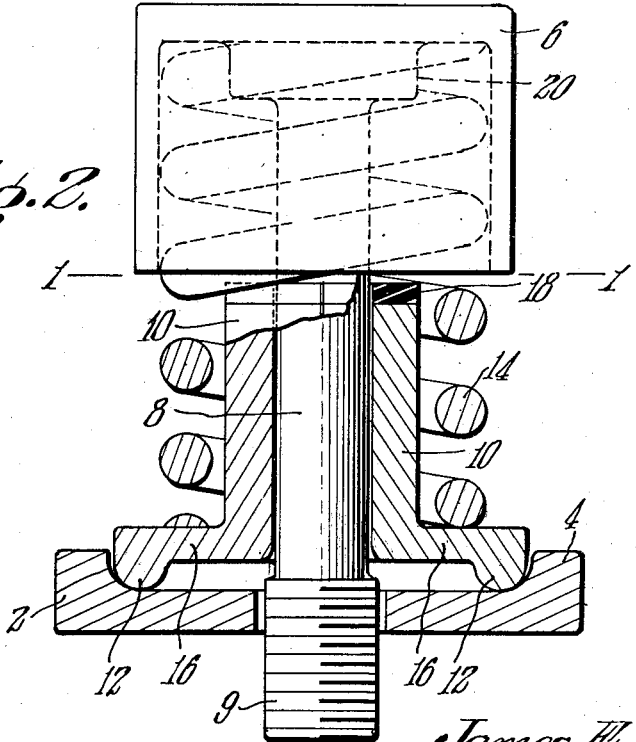
INVENTOR.
James E. Fleming.
BY Walter C. Ross
Attorney.

Patented Jan. 10, 1950

2,493,739

UNITED STATES PATENT OFFICE 2,493,739

SHOCK ABSORBER

James E. Fleming, West Springfield, Mass.

Application January 31, 1946, Serial No. 644,530

2 Claims. (Cl. 267—9)

This invention relates to improvements in shock absorbers.

The principal objects of the invention are directed to the provision of a shock absorber which is simple in form to facilitate economy in manufacture and which is efficient in operation.

The shock absorber is adapted for many and various uses such as for trucks, automobiles, railroad equipment, airplane landing gear and the like, and is so constructed and arranged that it may be located between the components of a vehicle or the like which is likely to move towards one another.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Fig. 1 is a sectional plan view through a shock absorber on the line 1—1 of Fig. 2; and Fig. 2 is a side elevational view of the shock absorber of the invention with the lower part in section on the line 2—2 of Fig. 1.

Referring now to the drawings more in detail, the invention will be fully described.

A base 2 is provided which may have a rim 4 inwardly of which is a more or less curving seat, as shown. The base 2 may be secured in any convenient manner to a part of a vehicle.

A cap 6 has a friction post 8 depending therefrom which may be secured to the cap in any desired manner or it may be integral therewith all as may be desired.

A plurality of segment members 10 are disposed around the central post 8 and these have curved lower portions 12 which rest in the seat inside of the rim 4 of the base and function as fulcrums for the segments.

A spring 14 is disposed between the cap 6 and outwardly extending portions 16 of the segments. There may be plural springs if desired.

In the form of the invention shown, the post is plural sided to provide a plurality of friction faces which are engageable with friction faces of the segments 10. There may be as many segments and friction faces as may be desired.

Buffer members 18 are carried by upper ends of the segments. These may be made from rubber, rubber composition or the like so as to be yieldable or resilient and they may be secured to the segments in any well known manner.

The shock absorber may be disposed between any relatively movable members or members that move towards and away from one another.

As an upper member acts on and moves the cap 6 downwardly the spring 14 resists the downward movement to overcome the shock. As the cap is moved downward the spring not only resists movement thereof to absorb the shock but the spring bears on the segments so as to tilt them inwardly whereby their friction faces engage the faces of the post 8.

When it is desired to provide a free downward movement of the cap and post and a somewhat slow recoil action, the friction faces may incline inwardly at their upper portions. The friction faces may be arranged to retard downward movement of the cap and post or may be arranged to provide various actions of the absorber, the spring means as it is under compression acts on to tilt the segments inwardly for the desired frictional action. That is, the friction faces may be made to cooperate with the absorbing action of the spring means and to retard or snub the recoil of the device.

The buffers 18 act in conjunction with a part 20 associated with the post when the cap is depressed sufficiently for engagement thereof.

The lower end 9 of the post is threaded as shown so that a nut or nuts may be applied thereto for drawing the post and cap towards the base to provide a desired load or stress in the spring means and may be desirable in some cases.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A shock absorbing construction comprising in combination, a base having an upper seat surface and a central opening therethrough, a plurality of circumferentially arranged segment members having lower flange portions and upwardly extending portions, relatively narrow seating portions on the under sides of said flange portions resting on said seat surface whereby said segments may tilt relative to said base, a coil spring around the upwardly extending portions having a lower end resting on said flange portions inwardly of said seating portions, a cap on the upper end of said spring, a friction post extending through the upwardly extending portions of said segments having an upper end secured to said cap, said post provided with longitudinally extending relatively angularly disposed flat faces and portions of the upwardly extending portions of the segments adjacent said flat faces having faces substantially complemental thereto and normally lightly frictionally engaging the same, all adapted and arranged whereby as the cap is moved towards said base to act on said spring the segments are tilted inwardly so that the flat faces thereof frictionally engage the flat faces of the post to retard downward movement of the post and cap, and buffer means on the upper ends of the upwardly extending portions of the segments engageable by said cap when in lower position.

2. A shock absorbing construction comprising in combination, a base having an upper seat surface and a central opening therethrough, a plurality of circumferentially arranged segment members having lower flange portions and upwardly extending portions, relatively narrow seating portions on the under sides of the flange portions resting on the seat surface whereby said segment members may tilt relative to said base, a coil spring around the upwardly extending portions having a lower end resting on the flange portions inwardly of said seating portions, a cap on the upper end of said spring, a friction post extending through the upwardly extending portions of said segment members having an upper end secured to said cap, said post being provided with longitudinally extending relatively angularly disposed flat faces and portions of the upwardly extending portions of said segment members adjacent the flat faces having faces substantially complemental thereto and normally lightly frictionally engaging the same, all adapted and arranged whereby as said cap is moved towards said base to act on said spring said segment members are tilted inwardly so that the flat faces thereof frictionally engage the flat faces of said post to retard downward movement of said post and cap, and a buffer means on the upper ends of the upwardly extending portions of said segment members engageable by said cap when in lower position.

JAMES E. FLEMING.

REFERENCES CITED

The following references are of record in the file of this patent:

UNITED STATES PATENTS

| Number | Name | Date |
|---|---|---|
| 1,442,893 | Lewis | Jan. 23, 1923 |
| 1,644,391 | Mitchell | Oct. 4, 1927 |
| 2,073,761 | Shafer | Mar. 16, 1937 |
| 2,386,107 | Geiger | Oct. 2, 1945 |
| 2,402,536 | Dath | June 25, 1946 |